(12) United States Patent  
van den Berg et al.

(10) Patent No.: US 8,798,006 B2  
(45) Date of Patent: Aug. 5, 2014

(54) REAL-TIME COMPARISON OF QUALITY OF INTERFACES

(75) Inventors: Eric van den Berg, Hoboken, NJ (US); Sunil Madhani, Lake Hopatcong, NJ (US); Tao Zhang, Fort Lee, NJ (US)

(73) Assignees: Toshiba America Research, Inc., Washington, DC (US); Telcordia Technologies, Inc., Piscataway, NJ (US)

( * ) Notice: Subject to any disclaimer, the term of this patent is extended or adjusted under 35 U.S.C. 154(b) by 228 days.

(21) Appl. No.: 12/973,300

(22) Filed: Dec. 20, 2010

(65) Prior Publication Data

US 2011/0085463 A1    Apr. 14, 2011

Related U.S. Application Data

(62) Division of application No. 11/209,331, filed on Aug. 23, 2005, now Pat. No. 7,885,185.

(60) Provisional application No. 60/662,749, filed on Mar. 17, 2005.

(51) Int. Cl.  
*H04L 12/26* (2006.01)

(52) U.S. Cl.  
USPC ........... 370/332; 370/230; 370/252; 370/331; 455/436; 709/224

(58) Field of Classification Search  
None  
See application file for complete search history.

(56) References Cited

U.S. PATENT DOCUMENTS

| | | | |
|---|---|---|---|
| 7,165,102 B2 | 1/2007 | Shah et al. | |
| 7,885,185 B2* | 2/2011 | van den Berg et al. | 370/230 |
| 7,995,501 B2* | 8/2011 | Jetcheva et al. | 370/255 |
| 8,111,651 B2* | 2/2012 | Twitchell, Jr. | 370/328 |
| 8,223,659 B2* | 7/2012 | Do et al. | 370/248 |
| 8,331,239 B2* | 12/2012 | Yamada | 370/238 |
| 2005/0002379 A1 | 1/2005 | Bye | |
| 2006/0085532 A1 | 4/2006 | Chu et al. | |
| 2007/0140256 A1* | 6/2007 | Yaqub | 370/395.5 |
| 2007/0268852 A1 | 11/2007 | Stegmaier et al. | |
| 2008/0209026 A1* | 8/2008 | Qi et al. | 709/223 |

OTHER PUBLICATIONS

Mukhopadhyay, Nitis et al., "Applied Sequential Methodologies: Real-world Examples with Data Analysis," Marcel Dekker, Monticello, New York, 2004, pp. 339-340.*

Hu, N. and Steenkiste, P. "Evaluation and Characterization of available bandwifth probing techniques," IEEE Journal on Selected Areas in Communications, Aug. 2003, vol. 21 Issue 6, pp. 879-894.

Jain, M. and Constantinos, Dovrolis "End-to-End Available Bandwidth: Measurement Methodology, Dynamics, and Relation with TCP Throughput," IEEE/ACM Transactions on Networking, Aug. 2003, vol. 11 Issue 4, pp. 537-549.

(Continued)

*Primary Examiner* — Donald Mills  
(74) *Attorney, Agent, or Firm* — Westerman, Hattori, Daniels & Adrian, LLP

(57) ABSTRACT

In some embodiments, a system and method for substantially real-time comparison of quality of interfaces by mobile devices over heterogeneous networks is disclosed. The method can be performed using a dynamic and rapid comparison by distributed hosts, using a minimal number of injected network packets, using minimal path quality metrics, which path quality metrics are independent of how a QoI is measured, and in a manner suitable for both wireline and wireless networks.

16 Claims, 8 Drawing Sheets

(56) References Cited

OTHER PUBLICATIONS

Melander, Bob et al "A New End-to-End Probing and Analysis Method for Estimating Bandwidth Bottlenecks," Proceedings of Global Internet 2000, Nov. 2000, Uppsala University, pp. 1-9.

Prasad, R.S. et al "Bandwidth estimation: Metrics, Measurements, Techniques, and Tools," pp. 1-9.

Saroiu, Stefan et al "SProbe: A Fast Technique for Measuring Bottleneck Bandwidth in Uncooperative Environments," Submitted for publication, 2002, http://sprobe.cs.washington.edu/sprobe.ps., University of Washington.

* cited by examiner

REAL-TIME COMPARISON OF QUALITY OF INTERFACES

This application is a divisional of U.S. application Ser. No. 11/209,331, filed on Aug. 23, 2005 which claims priority under 35 U.S.C. 119 to U.S. Provisional Application Ser. No. 60/662,749 filed on Mar. 17, 2005, entitled Real-Time Comparison of Quality of Interfaces (QoI), by Van Den Berg, et al., the entire disclosure of which is incorporated herein by reference.

FIELD OF THE INVENTION

The present application relates to communications over computer networks. The preferred embodiments also relate more particularly to systems and methods for comparing the qualities of interfaces and, most particularly, to real-time comparison of quality of interfaces by mobile devices over heterogeneous radio networks.

BACKGROUND

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11 g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Quality of Interfaces

A number of approaches are available that compare the qualities of the interfaces based on a very narrow set of criteria such as radio signal strength or signal to noise ratios. However, these approaches limit their comparison to the radio network.

Using end-to-end path quality comparisons to select optimal paths has been studied in Reference [6], incorporated herein below, in the context of MPLS (Multi-protocol Label Switching) networks, where a centralized decision is made on optimal routes to connect traffic sources and destinations. Furthermore, the end-to-end path quality comparisons are used within a single autonomous domain, where the network operator typically has access to all the required statistics. However, these statistics are hard to estimate for an individual mobile. Therefore, such methods are not suitable for an individual multi-interface (mobile) host to compare the qualities of its interfaces in real time.

In addition, techniques are currently available for estimating the available bandwidth, delay or jitter along a network path and may be used to estimate these parameters for multiple interfaces and then compare them (see Reference [10] incorporated below). However, these techniques typically require the device to send a large number of probe packets resulting in long delays and significant waste of scarce wireless network resources; hence, they are not suitable for wireless devices.

The following background references show, among other things, some background technologies related to comparing qualities of interfaces, all of which references are incorporated herein by reference in their entireties as though recited herein in full.

[1] V. J. Ribeiro et al. "pathChirp: Efficient Available Bandwidth Estimation for Network Paths", PAM Workshop, 2003.

[2] M. Jain, C. Dovrolis, "End-to-End available bandwidth: measurement methodology, dynamics, and relation with TCP throughput," Proceedings of ACM SIGCOMM, 2002.

[3] B. Melander, M. Bjorkman, P. Guningberg, "A new end-to-end probing and analysis method for estimating bandwidth bottlenecks," Global Internet Symposium, 2000.

[4] K. Lai, M. Baker, "Measuring link bandwidth using a deterministic model of packet delay", ACM SIGCOMM, Aug. 2000.

[5] N. Hu, P. Steenkiste, "Evaluation and Characterization of Available Bandwidth Probing Techniques", IEEE Journal of Selected Areas in Comm., Vol. 21, No. 6, Aug. 2003, pp. 879-894.

[6] T. Anjani et al., "A New Path Selection Algorithm for MPLS Networks Based on Available Bandwidth Estimation", QofIS/ICQT 2002, LNCS 2511, pp. 205-214, 2002.

[7] T. Anjani et al., "ABEst: An Available Bandwidth Estimator within an Autonomous System.", Proceedings Globecom 2002.

[8] B. K. Gosh, P. K. Sen, "Handbook of Sequential Analysis", Marcel Dekker, NY, 1991.

[9] H. R. Neave, P. L. Worthington, "Distribution Free Tests", Unwin Hyman, London, 1988.

[10] R. S. Prasad, M. Murray, C. Drovolis and K. Claffy, "Bandwidth estimation: metrics, measurement techniques, and tools", IEEE Network, 2004.

[11] S. Saroiu, P. K. Gummadi, S. D. Gribble, "SProbe: A Fast Technique 'for Measuring Bottleneck Bandwidth in Uncooperative Environments", Proceedings IEEE Infocom, 2002.

[12] H. Kaaranen et al. "UMTS Networks: Architecture, Mobility and Services", Wiley, 2001.

[13] V. K. Garg, "IS-95 CDMA and cdma2000: Cellular/PCS Systems Implementation", Prentice-Hall, 2000.

While a variety of communication systems and methods are known, there remains a need for improved and enhanced systems and methods for communicating over the Internet and/or other networks. Among other things, while there has been work done in the area of physically tracking devices and people, existing systems do not allow, inter alia, messages to be directed to particular locations and not to other locations.

SUMMARY OF THE PREFERRED EMBODIMENTS

The preferred embodiments of the present invention can significantly improve upon existing methods and/or apparatuses.

As discussed above, a number of approaches are available that compare the qualities of the interfaces based on a very narrow set of criteria such as radio signal strength or signal to noise ratios, which approaches limit their comparison to the radio network. On the other hand, in the preferred embodiments of the present invention, approaches are designed to handle many more criteria of interface qualities, taking a full end-to-end network path into account—including, by way of example, round-trip available bandwidth, end-to-end delay and delay jitter, unidirectional available bandwidth, delay and delay jitter along an end-to-end network path through each interface.

Other methods are either 1) not suitable for dynamic, rapid comparison by distributed hosts or 2) not applicable to general comparison metrics for path. According to the preferred embodiments, techniques are provided for a device to make rapid comparisons of the quality of the interfaces using a minimal number of injected network packets, requiring minimal information regarding path quality metrics, and making it suitable for both wireline and wireless networks.

According to the preferred embodiments, methods employed can achieve the comparison with a very small number of probe packets and can be done in a much shorter time, hence it is well suited for wireless networks and for situations where comparison needs to be done quickly (e.g., when QoI comparison is used as the basis for determine when to handoff into a new network).

In the preferred embodiments, techniques are provided for a multi-interface device to dynamically and rapidly compare the qualities of its interfaces in a domain of wireline and/or wireless paths in real-time, and with minimal injection of network traffic. These techniques preferably need minimal information about path quality metrics.

According to some embodiments, a method for substantially real-time comparison of quality of interfaces (QoIs) by mobile devices over heterogeneous wireless networks, comprising: comparing in substantially real-time the qualities of multiple interfaces using path quality metrics that are independent of how the QoI is measured, whether measured by a path through a wireless network alone or a path through both a wireless network and through a wired network, said method including comparing path quality as a quickest change detection problem for observations from a new interface or comparing path quality based on sequential two sample tests.

According to other embodiments, a method for substantially real-time comparison of quality of interfaces (QoIs) by mobile devices over heterogeneous wireless networks, comprising: comparing in substantially real-time the qualities of multiple interfaces using path quality metrics that are independent of how the QoI is measured, whether measured by a path through a wireless network alone or a path through both a wireless network and through a wired network, said method including performing a one-sample change point detection method or performing a non-parametric and on-line two-sample method.

According to other embodiments, a method for substantially real-time comparison of quality of interfaces (QoIs) by mobile devices over heterogeneous wireless networks, comprising: comparing in substantially real-time the qualities of multiple interfaces using path quality metrics that are independent of how the QoI is measured, including comparing path quality as a quickest change detection problem for observations from the new interface. In some examples, there are a set of observations from a new interface, and said comparing includes detecting whether the mean of these observations will be higher than an average available metric value. In some examples, the method includes employing a cumulative sum procedure for a path quality comparison.

According to other embodiments, a method for substantially real-time comparison of quality of interfaces (QoIs) by mobile devices over heterogeneous wireless networks, comprising: comparing in substantially real-time the qualities of multiple interfaces using path quality metrics that are independent of how a QoI is measured, including comparing path qualities based on sequential two sample tests.

According to other embodiments, a method for substantially real-time comparison of quality-of-interfaces by mobile devices over heterogeneous radio networks, comprising: comparing in substantially real-time the qualities of multiple interfaces using independent QoI metrics and methods used to obtain QoI measurement, whether measured by a path through a radio network alone or a path through both a radio network and through a wired network.

In some illustrative examples a multi-interface mobile device or host may have N interfaces (e.g., where N=2 or more). In some preferred embodiments, measurements are taken on each of these interfaces that reflect the Quality of Interface (QoI). Illustrative examples of such measurements can include: end-to-end available bandwidth; round-trip delay; etc. The mobile device or host preferably includes a functional element or module with which a comparison of the QoI measurements takes place.

In the preferred embodiments, methods for quick, real-time comparison of the QoIs for different measurement scenarios are provided. While illustrative examples are described in which a mobile has two interfaces, the methods can each be generalized cases when the mobile has N>2 interfaces.

Case 1

In some examples, we may have many QoI measurements from the current interface, but not many from the other interfaces. In such examples, we can employ a methodology based on quickest sequential change detection.

In the preferred embodiments, the method is related to a cumulative sum (CUSUM) procedure, applied in a novel way as follows: let the null hypothesis $H_0$ be that the new interface does not provide significantly higher average bandwidth than the current path. We can apply the CUSUM procedure to solve the path quality comparison problem as follows:

Step 1: From m observations $\{X_1, \ldots, X_m\}$ on the current interface, compute the sample mean $\mu_1$ and the sample standard deviation $\sigma_1$.

Step 2: For each new observation $X_m$ a) If the observation is from the current interface, update $\mu_1$ and $\sigma_1$, b) If $X_m$ is from the new interface, calculate $Z_n=(Z_{n-1}+((X_m-\mu_1)/\sigma_1-k)\hat{}+$, $Z-0=0$ where $(x)\hat{}+=x$ if $x>0$, and 0 otherwise.

Step 3: If $Z_n>h$, then recommend switching interfaces (reject $H_0$), otherwise don't switch interface.

Note that the above procedure treats the observations from the old the new interfaces as if they are from the same data series and then seeks to detect whether and when the mean of this combined data series will change. This type of approach for detecting changes in a mean fall into the genre of methods commonly referred to as one-sample change-point detection methods.

An example of this process is shown in FIG. 2. An interface switch is initiated/recommended after the 12th observation, indicated by the red points above the threshold line h.

Case 2

Suppose we have paired observations, $(X_n, Y_n)$, one observation for each interface. If necessary, we construct paired observations by discarding the "old" observations on the current interface that do not have matching observations on the new interface and then match each observation on the new interface by its closest observation in time on the current interface.

Paired observations can be used for effective path quality comparisons, for example, when the path quality metric is highly non-stationary, or $X_n$ and $Y_n$ are strongly correlated, or when paired observations on both interfaces are easy to obtain. Since each interface uses a different network path, $X_n$ and $Y_n$ are assumed to be independent. We consider the differences: $Xt_n = X_n - Y_n$.

If the scale of the $Xt_n$ is known/estimated, e.g., $\sigma t_1$, we proceed by calculating $$Zt_n = ((Zt_{n-1} + (Xt_n/\sigma t_1 - kt), Zt0 = 0.$$

as in Step 2b) described above, and rejecting $H_0$ if in Step 3, for appropriate values of ht and kt.

In the quickest change detection methods 1) and 2) described above, accurate estimates of the mean path quality of the current network path and/or its variance are needed. In the following alternate approaches, however, such is not needed.

Case 3

In some examples, a mobile may not have extensive knowledge of the quality of the current path but may have several measurements for both paths. In such a context, it is still possible to make a principled decision as to which interface has a higher quality.

In the preferred embodiments, a two-sample statistical test is used to compare the quality of the two paths. The input data to the test are the measured or predicted available bandwidth values for each interface. As each interface uses a different network path, we assume the data points for the two interfaces are independent samples. We test the difference in average quality by testing for a difference in location (mean/median) of the two samples. Our approach includes using a test which is non-parametric (distribution free), works for unequal sample sizes, and is online (quick to compute, essentially independent of the length of the available samples.). A test which satisfies these requirements is Rosenbaum's test.

Let $A = \{X_1, \ldots, X_{n1}\}$ denote the set of observations of available bandwidth included in sample set A containing samples from the current interface. Here, $X_1 \ldots X_{n1}$ are assumed to follow an arbitrary distribution with cumulative distribution function, $F(x) \ldots$. Similarly, let $B = \{Y_1, \ldots, Y_{n2}\}$ denote the values of the observations from the new interface, with common c.d.f. $G(x)$. Let $n = n1 + n2$. Without loss of generality, let the location of $G(x)$ be Theta and the location of $F(x)$ be 0. The null-hypothesis of our tests is: $H_0$: Theta=0 (i.e., the old interface does not provide significantly higher average available bandwidth), which is tested against the alternative $H_1$: Theta>0.

Suppose the spread of a distribution increases with its location and say the location of sample set B is greater than the location of samples in A. Suppose we combine sample sets A and B to create one large ordered sample set. Then, there is a tendency for B's data points to accumulate at the high end of the combined sample if the new interface provides higher average available bandwidth. Keeping this in mind, Rosenbaum's test statistic $T_R$ involves the total number of B's data points, which have a value larger than the largest value in A.

If the overall maximum is not from sample set B, then the test stops immediately, and the null-hypothesis $H_0$ is not rejected in favor of $H_1$. Otherwise, $H_0$ is rejected in favor of $H_1$ if $T_R$ is larger than a critical value C. To calculate C, we use the distribution of $T_R$. For independent samples this is easy, for any sample size $n = n1 + n2$. Asymptotically as $n1 \to \infty$, $n2 \to \infty$, with $n2/N 1 \to p$, this converges to simply: $P(T_R \geq h) = \approx p^h$.

Note that the Rosenbaum test is based on the length of the high-end "extreme run" of the samples in B, which is easy to track online.

This simple test is well-suited for cases where an increase in the mean is accompanied by an increase in the variance. Similarly, if we would have prior knowledge that typically a high location (e.g., mean or median) would be accompanied by a low spread (e.g., variance), then we could construct a similar test which only considers the "low-end" extreme run of the samples in A. This would be equally easy to apply.

On-line application of the above tests implies repetition of the test for every new observation or every new batch of observations. This means that the critical values of the tests would preferably be adjusted and/or that the tests are only applied a finite number of times.

Case 4

In some embodiments, if we have paired observations ($X_n$, $Y_n$), which are strongly correlated, the two sample tests described in Case 3 above are weaker or even invalid. To overcome this, we can use non-parametric approaches to test the differences. One on-line nonparametric test that we used for this purpose is the Wilcoxon sign-test. A similar non-parametric test, the Wilcoxon signed-rank test is more powerful, but has to maintain ranked samples, hence it is not an on-line algorithm.

Various Embodiments

Among other things, the preferred embodiments do not depend on application specific (e.g. decibel) thresholds. As expressed above, in the preferred embodiments, the cumulative sum tests (see 1 and 2) are used in a novel way, to compare two different samples, instead of detecting a change-of-mean in one sample or two-sample tests in (see 3 and 4) are chosen to be non-parametric (distribution free) and implementable in an on-line manner. Among other things, this is in contrast to parametric tests, which typically make the assumption that underlying distributions are Gaussian, and then use asymptotically optimal likelihood-ratio based tests, and traditional optimal nonparametric tests, which typically require availability of the entire measurement history. Moreover, the tests have good small sample behavior.

When a mobile has N>2 interfaces available, the above-discussed comparison tests can still be used. In this regard, a decision of interest is the best network path among the N candidates; accordingly, a total of N−1 pair-wise tests (e.g., between the current path and each of the N−1 alternatives) can be employed in some embodiments.

According to the preferred embodiments, the solutions are not limited to radio signal strength measurements, and can take into account, inter alia, the quality of the end-to-end path from an interface to a corresponding host. In contrast, current approaches for mobile interface comparison only take into account the radio network, and in particular are largely based on signal strength alone.

The preferred embodiments described herein solve existing problems in the art based on a unique understanding of computer networks, performance measurements, statistics and more. Existing methods that involve merely measuring bandwidth are not suitable for wireless networks. In addition, other art single-handedly addresses comparing metrics but those arts require information for the comparison which may not be available to mobile hosts. Similarly, statistical change detection methods have been devised which typically only looks for changes in single measurement streams instead of multiple ones.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the various inventions described herein and that such examples are not intended to limit the invention to preferred embodiments described herein and/or illustrated herein General:

Emerging mobile devices are equipped with multiple interfaces allowing users to take advantage of heterogeneous radio technologies (e.g., cellular networks and wireless LANs). To support mobility and quality of service (QoS) for such multi-interface mobile devices, it is important to dynamically determine which interface or interfaces a mobile should use and when to switch from one interface to another. To make such decisions, it is critical for the mobile to compare the "qualities of the interfaces (Qol)", which may be measured by a variety of metrics, in real time so that the mobile can switch from one interface to another without user perceivable interruptions to on-going applications. This application, among other things, presents and analyzes new techniques for a mobile device to make rapid comparison of the quality of the interfaces using quickest sequential change detection and sequential two-sample hypotheses tests.

The preferred embodiments contemplates that future wireless networks will use multiple radio technologies to meet different communication needs. For example, short-range radio technologies (e.g., Bluetooth) may be used to connect nearby devices (e.g., devices carried by a person or inside an office, vehicle, or home); private or public wireless LANs (e.g., IEEE 802.11) for continuous coverage throughout a building, a campus, an airport, a shopping mall, and cellular radio systems (e.g., GSM, GPRS, cdma2000, WCDMA) for wide-area coverage. Therefore, mobile devices (also referred to herein as mobiles) are being equipped with multiple radio interfaces, each supporting a different radio technology.

Figure 1A:
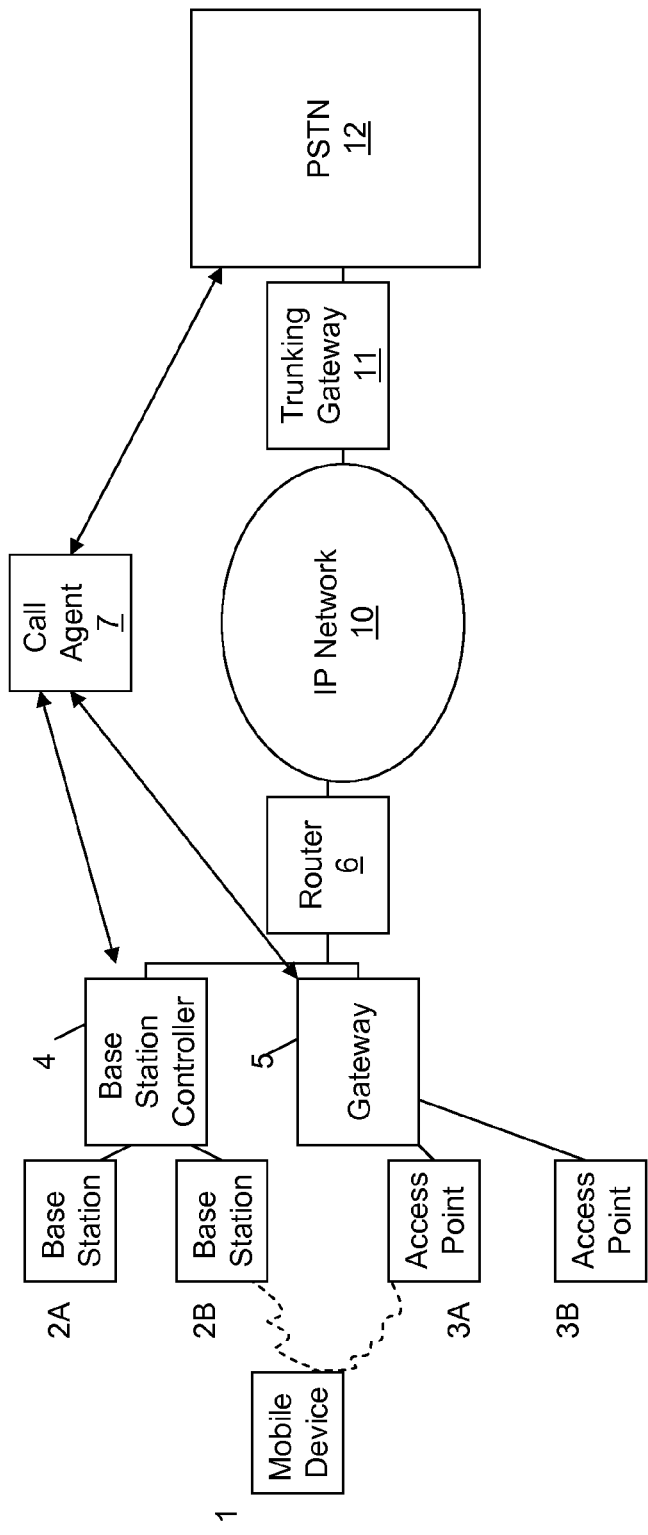
FIG. 1(A) is an architectural diagram depicting an illustrative environment in which a mobile device having a plurality of interfaces communicates with a plurality of networks.

By way of example, FIG. 1(A) shows an illustrative future network configuration in which a mobile device 1 is shown as having interfaces for communicating with base stations 2A, 2B and access points 3A, 3B. In this illustrative example, the base stations 2A and 2B are shown as communicating with a base station controller 4 that in turn communicates with a call agent 7 which is in communication with the public switched telephone network (PSTN) 12. As also shown, the access points 3A and 3B can include, e.g., IP network access points and can be in communication with a gateway 5 that communicates, in turn to a router 6 that communicates via an IP network 10, such as, e.g., the Internet, via a trunking gateway 11 to the public switched telephone network 12.

To take full advantage of different radio technologies, a mobile device preferably is configured to select which radio interfaces (i.e., radio networks) to use and when to switch between the interfaces (hence, between radio networks), preferably in a seamless manner with little interruption to user applications. Therefore, a significant question to answer before switching to a new interface is whether a new interface will provide higher quality for a future time period than the currently used interface. The quality of an interface (Qol) can be measured in different ways depending on circumstances, such as, e.g., the needs of user applications.

Figure 1B:
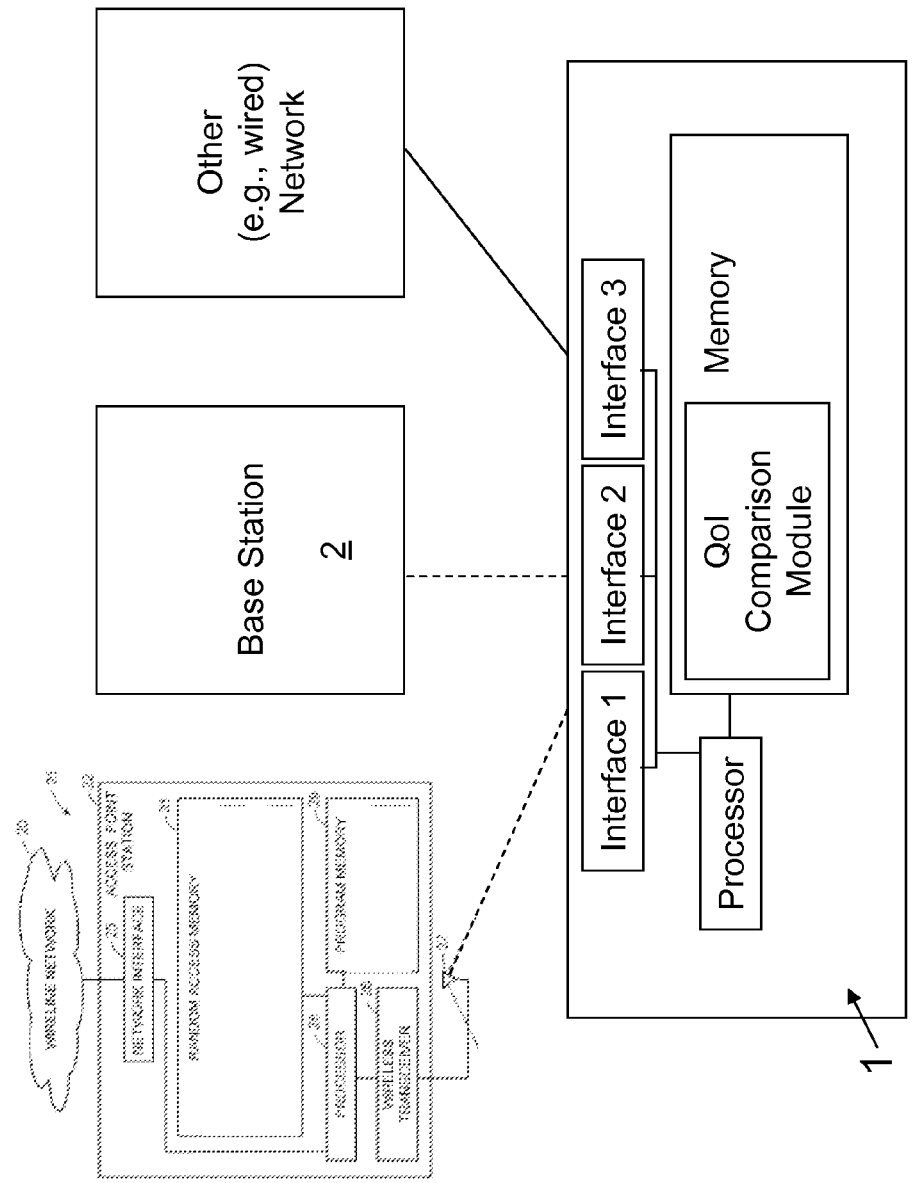
FIG. 1(B) is another architectural diagram depicting an illustrative environment in which a mobile device having a plurality of interfaces communicates with a plurality of networks, and also illustrating some components of an illustrative mobile device and an illustrative access point with which the mobile device communicates in a first network.

With reference to FIG. 1(B), in some illustrative embodiments a mobile device 1 can include a plurality of interfaces. In the illustrated embodiment, three interfaces are shown: Interface 1; Interface 2 and Interface 3. However, in various embodiments any number of interfaces can be employed. In illustrative embodiments, a mobile device can include, e.g., portable computers, personal desk-top computers, PDAs, portable voice-over-IP telephones and/or other devices. Typically, such mobile devices will include a transceiver (including an antenna for communication with the access point), a processor, memory (including, e.g., program memory and Random Access Memory). As also shown, the memory can include a program or module, such as, e.g., Qol Comparison Module for carrying out functionality as described hereinbelow. In various embodiments, processes to be carried out by the mobile device can be performed via software, hardware and/or firmware as may be appropriate based on circumstances.

In an illustrative embodiment shown in FIG. 1(B), a mobile device 1 is shown that is capable of communicating via a plurality of networks, such as, e.g., via Interface 1-3. For example, the mobile device can communicate via the Access Point 22 or via a Base Station 2, similar to that shown in FIG. 1(B). Additionally, FIG. 1(B) also schematically depicts an example in which the mobile device 1 can also communicate with another network, such as, e.g., another wireless network or a wired networks. With reference to FIG. 1(B), in some illustrative and non-limiting embodiments, the access point 22 can be within a wireless local area network (WLAN) connected to a wireline network 20. In some examples, the wireline network 20 can include the Internet or a corporate data processing network. In some examples, the access point 22 can be a wireless router. In some embodiments, the access point 22 can have a network interface 25 linked to the wireline network 21 and a wireless transceiver in communication with the mobile device 1 and with other mobile devices. By way of example, the wireless transceiver 26 can include an antenna 27 for radio or microwave frequency communication with the mobile devices. The access point 22 preferably also has a processor 28, a program memory 29, and a random access memory 31.

Today, mobile devices typically use only the information regarding radio networks to measure and compare QoI. This information includes radio signal strength or signal-to-noise ratio (SNR). However, a high signal strength or a high signal-to-noise ratio does not necessarily mean a high available bandwidth or a low delay through the radio network.

In general, the QoI should reflect the quality of the network path, which may involve a path through the radio network and a path through a wired backbone network (such as, by way of example, a wireline network 20 like that shown in FIG. 1(B)), between the mobile device interface and a corresponding node with which, for example, the mobile device is ultimately communication with. Depending on circumstances, the quality of a network path may be measured in a variety of ways including unidirectional delay, round-trip delay, delay jitter, available bandwidth of the network path, or their combinations.

In some instances, the network path used to measure the QoI can be the path through the radio network only, for instance when the radio network is known to be the bottleneck in the end-to-end path. However, it is often difficult for a mobile to know whether a radio network or a wired backbone network will be the bottleneck for a particular application because it depends on a large number of factors that can dynamically change over time. These factors include, for example, the specific designs of the radio and the backbone networks, the current network loads in the radio and the backbone networks, the specific requirements of the application, and even the location of the mobile device.

Therefore, it is advantageous for a multi-interface mobile to be able to compare in real time the qualities of multiple interfaces regardless of how the QoI is measured—e.g., whether it is measured by the path through the radio network alone or by an end-to-end path that includes both a path in the radio network and a path through a wired network.

In this disclosure, novel and advantageous solutions to this QoI comparison problem are presented in which, for example, the available bandwidth of a network path is used as the measure of QoI. Accordingly, we will now discuss in more detail the meaning of the available bandwidth of a network path. To begin with, we first discuss the capacity of a network path. As discussed in Reference [10] incorporated above, the capacity of a link along a network path can be defined as the maximum possible IP-layer transfer rate across that link. Accordingly, the capacity C of the network path can then defined as the minimum link capacity in the path:

$$C = \min_{i=1,\ldots,H} C_i,$$

where $C_i$ is the capacity of the i-th link along the path and H is the number of links in the path. The available bandwidth of a link is the unused, "spare" capacity of the link during a certain time period. If $C_i$ is the capacity of link i, and u is the average utilization of that link in the given time interval, then the average available bandwidth $A_i$ of link I will be:

$$A_i = (1 - u_i) C_i$$

The available bandwidth of an H hop network path is then the minimum available bandwidth among the H links:

$$A = \min_{i=1,\ldots,H} A_i.$$

Illustrative approaches for estimating available path bandwidth exist and can be broadly classified in the following categories:

Self-Induced Congestion Approaches.

These approaches measure the available bandwidth or "spare" capacity along a network path. Self-induced congestion approaches are based on the following principle: If the rate of the probe packets exceeds the available bandwidth over a path, congestion will occur and the probe packets will be queued at the bottleneck router (or routers) along the path causing the inter-packet time interval to be longer at the receiver than at the sender. On the other hand, if the probing rate is below the available bandwidth over the path, no congestion will occur and the probe packets will experience no queuing delay. Therefore, the available bandwidth along a path can be estimated as the probing rate at the onset of congestion.

A few examples of self-induced congestion approaches include Pathload discussed in Reference [2] incorporated above, TOPP discussed in Reference [3] incorporated above, and PathChirp discussed in Reference [1] incorporated above. These methods need significant cooperation between nodes at both ends of a path to estimate the available path bandwidth.

Packet Pair Train Dispersion Methods.

With reference to References [4], [5] and [11], packet pair train dispersion methods estimate the Asymptotic Dispersion Rate along a path, a measure related to capacity, but influenced by the amount of cross traffic. Packet pair/train dispersion techniques typically need measurements at both ends of the network path. However, it is also possible to perform these measurements without access at the receiving node, by forcing the receiving node to send a message (such as, e.g., by forcing the receiving node to send ICMP port-unreachable or TCP RST packets) in response to each probe packet (see Reference [11] incorporated above).

Combined Self-Induced Congestion and Packet Pair Approaches.

In some embodiments, it is also possible to successfully combine self-induced congestion and a packet pair technique: examples of such hybrid methods include IGI, and PTR (see Reference [5] incorporated above). Like pathChirp, these hybrid methods are relatively efficient, specifically compared to the Pathload method. PathChirp reportedly uses less 10% of the probe-volume of the Pathload method (see Reference [1] incorporated above), and IGI/PTR converges much faster than the Pathload method, in approximately 10% of the time (see Reference [5] incorporated above). The reported convergence time of IGI/PTR is on the order of 4-6 round-trip times (RTTs).

TCP Bulk File Transfer Rate Approaches.

These methods measure available bandwidth by measuring the transfer time of a fixed-size file using the TCP protocol. A benefit of this technique is that it more closely reflects the available path bandwidth to be experienced by a data-application. However, the quality of the estimation depends on the behavior of the TCP protocol which may differ depending on the type of networks. If the file is requested or pushed from a server (e.g., a Web server), the quality of the estimation can also be affected by the load on the server. Since these methods use a TCP connection between both end nodes, they implicitly require cooperation at both ends of the network path.

A straight-forward approach to comparing the average available path bandwidths of two network paths over a future time period is to first estimate the average available path bandwidths probing mobile device to, send out a large number of probe packets. For example, Pathload (see Reference [2] incorporated above) may require several megabytes of probing traffic and may take hundreds of RTTs to obtain an estimate of the available bandwidth over a path. Although the packet pair approaches can reduce the number of probe packets, a substantial number of probe packet pairs will still be needed to obtain each sample of available bandwidth in order to reduce the potential inaccuracy caused by cross traffic. Sending a large number of probe packets will waste the scarce power resources on the mobiles and the scarce radio bandwidth and may also result in excessive handoff delay.

Methods also exist that rely on the knowledge of the past and recent link utilizations to estimate available bandwidth and to then select routes or paths to connect the traffic sources and destinations (see References [6] and [7] incorporated above). They are in fact used in a context of a single autonomous domain, where the network operator typically has access to the required statistics. However, these statistics are hard to know or estimate for an individual mobile, and therefore these methods are not suitable to be used by a mobile to compare the qualities of its multiple interfaces in real time. Therefore, in the preferred embodiments, a new category of methods that can be used by a multi-interface mobile device is presented in order to compare in substantially real-time or in real-time the qualities of its interfaces regardless of what Qol metrics is used (e.g., be it by the information regarding the radio network alone or by the available bandwidth of an end-to-end path) and how the Qol measurement is obtained.

The preferred embodiments are preferably adapted to meet the following requirements for Qol comparison needed by mobile terminals:
  Minimizing the probing traffic to be sent over the interfaces to reduce the consumption of the scarce power resources on the mobile and the scarce radio network bandwidth for transporting the probe traffic.
  Performing the comparison as quickly as possible to reduce handoff delay and potential interruptions to user applications.
  Supporting the comparison of both short-term and long-term Qol because the Qol may vary widely over time.
  Being able to handle arbitrary probability distributions of the Qol and the fact that this probability distribution may not be known to the mobile when Qol comparison needs to be performed.

The following section under Exemplary Embodiments sets forth and further describes some proposed approaches, followed by a discussion of illustrative performance results of the proposed approaches based on available path bandwidths measured over multiple real networks.

Exemplary Embodiments:
1. Basic Approach

Consider a mobile terminal with two interfaces, for example, one cellular radio interface allowing the mobile to access GSM, GPRS, cdma2000, or WCDMA and one wireless local area network (LAN) interface such as IEEE 802.11 allowing the user to access his/her enterprise networks and public wireless LAN hotspots. At any given time, we refer to the interface that the mobile has been using to support user applications as the current or old interface. We call the network path between the old interface and a reference node the old network path. The reference node could be, for example, the corresponding node or a gateway that the traffic between the mobile and the corresponding node traverses. We refer to the interface that the mobile is not currently using to transport application traffic as the new interface and we call the network path between the new interface and the reference node the new network path.

One objective of the Qol comparison problem is to determine in real time whether the new interface will have a significantly higher Qol (which, we assume as an example, is measured by the average available path bandwidth.) over a future time period. To meet the main design requirements outlined above, a central idea is to take advantage of the information a mobile can accumulate on the Qol of the old interface in a way that the mobile needs little information on the Qol of the new interface to carry out the comparison. This idea allows the proposed methods to have the following important characteristics:

Able to compare the average available path bandwidth without having to know the average path bandwidth of a new interface first. The preferred embodiments do not require the mobile to know the average available bandwidth of the new path first in order to compare it with the average available bandwidth of the old path. The number of samples of the available bandwidth over the new path needed by the preferred embodiments can be significantly smaller than the number of samples needed to estimate the average available bandwidth of the new path. In fact, in some embodiments, a single sample could be used to obtain a rough comparison. In other embodiments, more samples could help increase the accuracy of the comparison. As a result, the preferred embodiments can significantly reduce the number of probe packets to be sent over the new path and the time it takes to complete the bandwidth comparison.

Independent of Qol metrics and methods used to obtain Qol measurement. The preferred embodiments involve methodologies that apply to any metrics used to measure Qol—such as, e.g., the available bandwidth of an end-to-end path or the path inside a radio network only, average delay, and average signal strength or SNR. Furthermore, the preferred embodiments involve approaches that do not depend on any particular method for obtaining samples of the Qol. For example, when the available path bandwidth is used to measure Qol, any methods described above for estimating the available path bandwidth may be used to obtain samples of the available path bandwidth.

Able to meet preset target confidence levels. The proposed methods are capable of performing comparisons that meet given confidence levels, i.e., limits on the occurrence of "false alarms".

2. Approaches Based on Quickest Sequential Change Detection

We assume that the mobile takes samples (observations) of the available bandwidth of the path it has been using to estimate the distribution of the available bandwidth on this path. This way, the mobile can obtain a good estimate of the average available path bandwidth $\mu_1$ of the old path and its standard deviation $\sigma_1$. We formulate the path quality comparison problem as a quickest change detection problem for observations of the available bandwidth from the new interface.

Suppose we have observations $B=\{Y_1, Y_2, \ldots\}$ from the new interface. The interface quality comparison problem is then to detect whether and when the mean of these samples in B will be higher than $\mu_1$. In other words, if from the m-th sample, the sample mean starts to be larger than $\mu_1$, we want to detect this change in the mean as quickly as possible.

The quickest sequential detection problem is discussed in Reference [8] incorporated herein above. The detection procedures typically seek to minimize the average detection delay T=N−m+1 (if m<∞) (where m is the time the mean-change occurred, and N is the time at which this change is detected), subject to a bound on the average run length or false alarm probability.

Next, we describe two ways to use sequential change detection methods in order to compare the path qualities. The first approach assumes that the observations from the old the new interfaces are obtained at different times, i.e., the observations cannot be well matched in time. This, for example, will be the case when observations of the old path are taken mostly before the need for a handoff occurs and the observations from the new path are taken at and immediately after the time point the mobile initiates the path quality comparison procedure (i.e., during the handoff process). The second approach assumes that the observations from the old' and new interfaces can be matched in time. This, for example, will be the case when the mobile can obtain observations from both interfaces at approximately the same time points.

Sequential Change Detection with Unmatched Observations

An efficient detection procedure, which has been proved optimal in the case of i.i.d., normally distributed observations, and in a variety of other settings (see Reference [9] incorporated above), is Page's cumulative sum or CUSUM procedure. It defines the variables $$\tilde{Y}_i = \frac{Y_i - \mu_1}{\hat{\sigma}_1} - k,$$

where k is a design parameter. Furthermore, it defines the variables $$W_n = S_n - \min_{0 \le i \le n}\{S_i\}, n \ge 1$$

$$S_i = \sum_{j=1}^{i} \tilde{Y}_j, \text{ with } W_0 = 0$$

The test now declares that a change has occurred as soon as $W_n \ge h, h > 0$.

A CUSUM procedure is defined by the two parameters k and h (see Reference [16] incorporated above). They are typically chosen to make the Average Run Length (ARL) of the test large if there is no change in the process mean, and small if there is a significant change in the mean. Parameter k influences the minimum (quickly) detected change, and keeps the test statistic small when there is no change in the mean. We can think of k as the overhead cost of switching interfaces. ARL values for different values of k and h have been tabulated and these tables can be used for selecting the values of parameters k and h.

Let the null hypothesis $H_0$ be that the new interface does not provide significantly higher average bandwidth than the current path, then we can apply the CUSUM procedure to solve the path quality comparison problem as follows:

Step 1: From m observations
$\{X_1, \ldots, X_m\}$
on the current interface, compute the sample mean
$\hat{\mu}_1$
and the sample standard deviation
$\hat{\sigma}_1$ Step 2: For each new observation $X_n$:
If the observation is from the current interface, update
$\hat{\mu}_1$
and
$\hat{\sigma}_1$
If $X_n$ is from the new interface, calculate $$Z_n = \left(Z_{n-1} + \frac{X_n - \hat{\mu}1}{\hat{\sigma}_1} - k\right)^+, \quad Z_0 = 0$$

where $(x)^+ = x$ if $x>0$, and 0 otherwise.

Step 3: If $Z_n > h$
then switch interfaces (reject $H_o$), otherwise don't switch interface.

Note that the above procedure treats the observations from the old the new interfaces as if they are from the same data series and then seeks to detect whether and when the mean of this combined data series will change. Such approaches for detecting changes in the mean are commonly referred to as one-sample change-point detection methods.

Matched Observations: Instantaneous Comparison

Now, suppose we have paired observations—e.g., the observations come in pairs, $(X_n, Y_n)$, one for each interface. If necessary, we construct paired observations by discarding the "old" observations on the current interface that do not have matching observations on the new interface and then match each observation $Y_n$ on the new interface by its closest observation in time $X_n$ on the current interface.

Paired observations can be used for effective path quality comparisons, for example, when the path quality metric is highly non-stationary, or $X_n$ and $Y_n$ are strongly correlated, or when paired observations on both interfaces are easy to obtain.

Since each interface uses a different network path, $X_n$ and $Y_n$ are assumed to be independent. We consider the differences:
$\tilde{X}_n = X_n - Y_n$
If the scale of the $X_n$ is known, e.g.,
$\tilde{\sigma}_1$
Then, we proceed by calculating $$\tilde{Z}_n = \left(\tilde{Z}_{n-1} + \frac{\tilde{X}_n}{\tilde{\sigma}_1} - \tilde{k}\right)^+, \quad \tilde{Z}_0 = 0$$

as in Step 2b) described above, and rejecting $H_o$ if
$\tilde{Z}_{n>\tilde{h}}$
in Step 3, for appropriate values of
$\tilde{h}$ and $\tilde{k}$ As for the limitations of the quickest change detection methods described above: a requirement for application of the above methods, is that we have accurate estimates of the mean path quality of the current network path and/or its variance.

Next, an approach is presented which is based on two-sample statistical tests, for cases where we do not have extensive knowledge of the quality of the current path.

3. Approaches Based on Sequential Two-Sample Tests

Suppose now that we do not have extensive knowledge of the quality of the current path. For example, we do not have sufficiently many measurements to have a reliable estimate of the mean quality of the current path and its variance, and we do not have matched observations. In that case, we cannot apply the methods described above under Approaches Based on Quickest Sequential Change Detection. However, suppose we do have several measurements for both paths. Then, we may use a two-sample statistical test to compare the quality of the two paths. Without knowing the exact values of the mean/median, we can still do a test of which interface has the higher mean or median. The input data to the test are the measured or predicted available bandwidth values for each interface. As each interface uses a different network path, we assume the data points for the two interfaces are independent samples.

We test the difference in average quality by testing for a difference in location (mean/median) of the two samples. The test and its test statistic should ideally have the following properties:

1) It should be non-parametric, preferably distribution free, as a mobile usually does not know the precise statistical distribution of the quality indicator, e.g. available bandwidth.
2) It should work for unequal sample sizes. Note that we may have many measurements on one (the current) interface, and only a few on the other interface due to time and mobility concerns.
3) It should be online, that is: quick to compute, and essentially independent of the length of the available samples. In particular, we do not want to keep around all past data values.

One parametric test, which possesses property 2 and 3 is the two sample t-test. A non-parametric test, which has property 1 and 2 is the Mann-Whitney test (see Reference [9] incorporated above). One simple procedure, which possesses (approximately) properties 1, 2 and 3 is Rosenbaum's test (see Reference [9] incorporated above). We describe this test in more detail next.

Let $A = \{X_1, \ldots, X_{n1}\}$ denote the set of $n_1$ observations of available bandwidth included in sample set A containing samples from the current interface. $X_1, \ldots, X_{n1}$ are assumed to follow an arbitrary distribution with cumulative distribution function $F(x)$. Similarly, let $B = \{Y_1, \ldots, Y_{n2}\}$ denote the values of the observations from the new interface, with common c.d.f. $G(x)$. Let $n = n_1 + n_2$. Without loss of generality, let the location of $G(x)$ be $\ominus$ and the location of $F(x)$ be 0. The null-hypothesis of our tests is: $H_0: \ominus = 0$ (i.e., the old interface does not provide significantly higher average available bandwidth), which is tested against the alternative $H_1: \ominus > 0$.

Suppose the location (median/mean) of sample set B is greater than the location of samples in A. Furthermore, assume that the spread (variance, range) of a sample is greater when its location is greater. Suppose we combine sample sets A and B to create one large ordered sample set. Then, there is a tendency for B's data points to accumulate at the high end of the combined sample if the new interface provides higher average available bandwidth. Keeping this in mind, Rosenbaum's test statistic $T_R$ involves the total number of B's data points, which have a value larger than the largest value in A.

If the overall maximum is not from sample set B, then the test stops immediately, and the null-hypothesis $H_0$ is not rejected in favor of $H_1$. Otherwise, $H_0$ is rejected in favor of $H_1$ if $T_R$ is larger than a critical value $C(\alpha, n_1, n_2)$. To calculate $C(\alpha, n_1, n_2)$, we use the distribution of $T_R$. For independent samples this is easy, for any sample size $N = n_1 + n_2$:

$$P(T_R \geq h) = \frac{n_2}{N} \times \frac{n_2 - 1}{N} \times \ldots \times \frac{n_2 - h + 1}{N - h + 1} = \frac{n_2!(N-h)!}{N!(n_1-h)!}$$

Now, asymptotically as $n_1 \to \infty$, $n_2 \to \infty$ with $$\frac{n_2}{N} \to p$$

this converges to simply:

$$P(T_R \geq h) \approx p^h$$

Note that the Rosenbaum test is based on the length of the high-end 'extreme run' of the samples in B, which is easy to track online. This simple test is well suited for the case where an increase in the mean is accompanied by an increase in the variance. Similarly, if we would have prior knowledge that typically a high location (e.g., mean or median) would be accompanied by a low spread (e.g., variance), then we could construct a similar test which only considers the "low-end" extreme run of the samples in A. This would be equally easy to apply.

On-line application of the above tests implies repetition of the test for every new observation or every new batch of observations. This means that the critical values of the tests have to be adjusted (see Chapter 7 in Reference [8] incorporated above) and/or the tests are only applied a finite number of times. If we have paired observations $(X_n, Y_n)$, which are strongly correlated, the above two-sample tests are weaker or even invalid. To overcome this problem, we can use nonparametric approaches to test the differences $$\tilde{X}_n = X_n - Y_n$$

One on-line nonparametric test that can be used for this purpose is the Wilcoxon sign-test (see Reference [13] incorporated above). A similar non-parametric test, the Wilcoxon signed-rank test is more powerful, but has to maintain ranked samples, hence it is not an on-line algorithm.

When a mobile has N>2 interfaces available, we can still use the two-sample comparison tests described in the above sections on Approaches Based on Quickest Sequential Change Detection and Approaches Based on Sequential Two Sample Tests. Since we are only interested in the best network path among the N candidates, a total of N−1 pair-wise tests (e.g. between the current path and each of the N−1 alternatives) will suffice.

Performance Analysis:

We have analyzed the performance of our methodology using both simulated and real measurements of path bandwidths. Due to space restrictions, only the results based on real measurements are presented below.

Figure 2A:
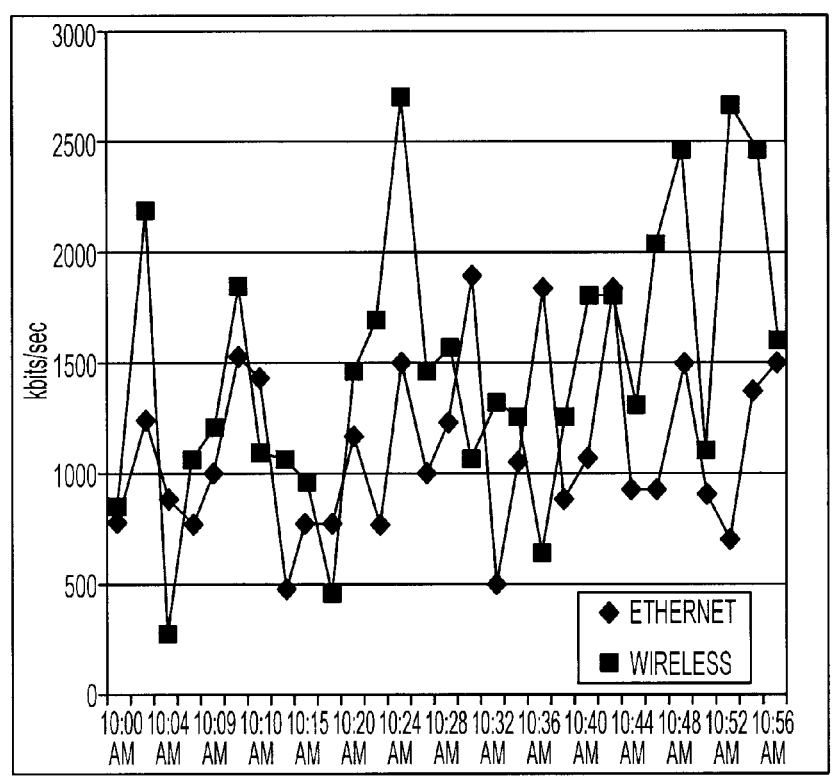
FIG. 2(A) is a graph depicting Ethernet and Wavelan available path bandwidths to an illustrative node at www.toast.net.

Results on Real Available Bandwidth Measurements: Ethernet, WLAN, and 1xRTT CDMA We have collected a series of measurements of available bandwidth from two interfaces on a mobile terminal: a 10 Mbps Ethernet link and a Wavelan 802.11 11 Mbps link to a test site identified by www.toast.net. The available bandwidth was measured via the TCP bulk file transfer technique. The available bandwidths were collected every 2 minutes from 10:00 AM to 10:56 AM on a particular day on our local Ethernet and WLAN. See FIG. 2(A).

Figure 2B:
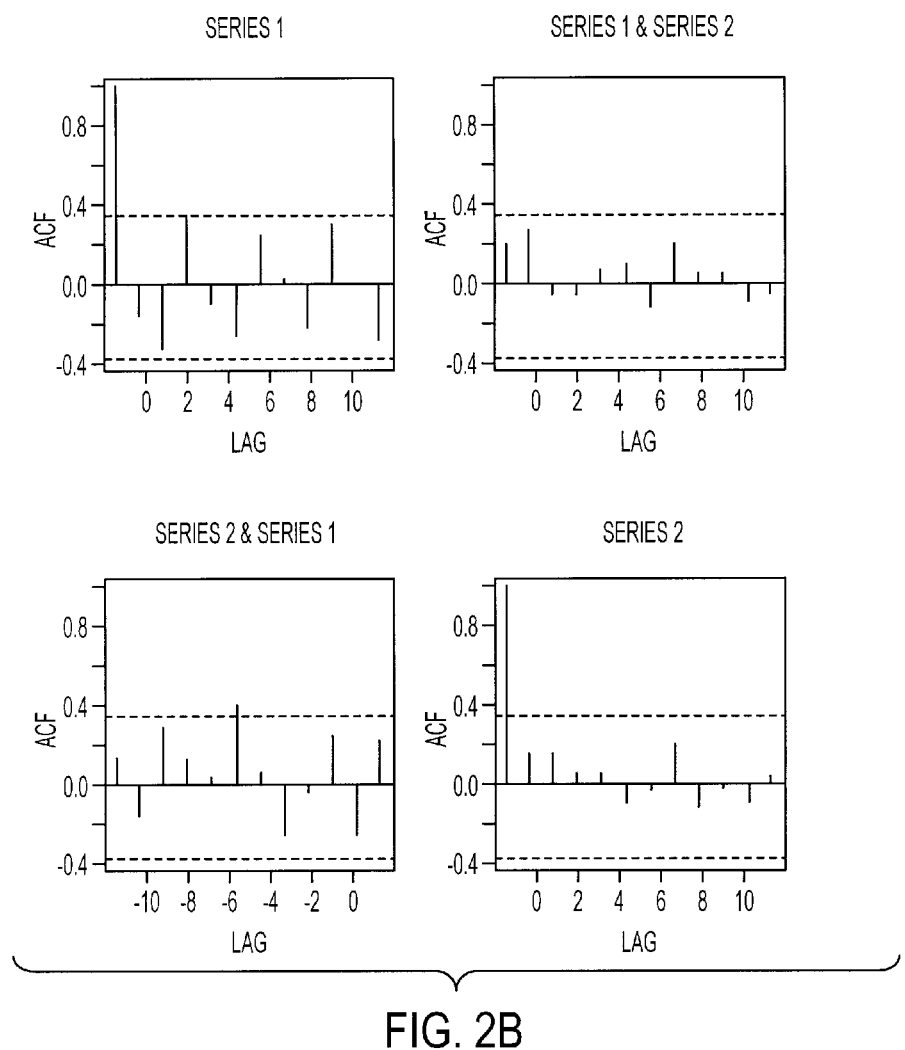
FIG. 2(B) is a set of graphs showing pair-wise correlation functions between available bandwidth series of Ethernet and Wireless links according to some illustrative examples.

First, we present some preliminary analysis of each of the measurement series. The Ethernet link has mean deviation 626.4 kbps. As shown in FIG. 2(B), the auto-correlation function plots show both series appear serially uncorrelated. However, the sample correlation coefficient between the two series is non-zero, 0.247, indicating that the available path bandwidths are not completely independent. Next, we tested the samples for normality. The Kolmogorov-Smirnov test applied to each measurement series did not reject the hypothesis that they were Gaussian with their given mean and standard deviation. The Shapiro-Wilk test gave the same results.

Next, we applied the proposed path quality comparison approaches based on the two CUSUM tests described in the above sections under "Proposed Approaches" to compare the average available bandwidth of the two network paths. The parameters h and k were chosen as follows: 1) k=0.5 to achieve good performance for detecting shifts of about one standard deviation or more, and 2) h=3, corresponding to an Average Run Length of about 117 if there is no change in the mean. The first CUSUM test was run with "prior knowledge" of $\hat{\mu}_1$=1126 kbps. and $\hat{\sigma}_1$=391 kbps.

Figure 3:
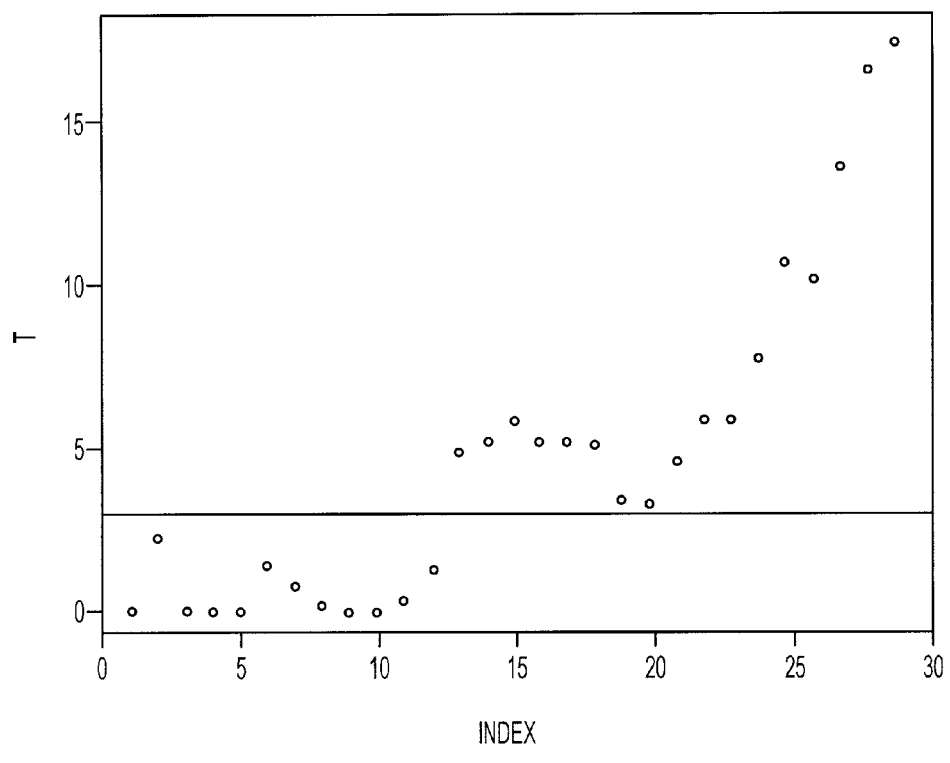
FIG. 3 is a graph showing illustrative results for a CUSUM test on real measurements according to some illustrative examples.

It detects the difference in mean available bandwidth at the 13th observation, as shown in FIG. 3. Notice that the detection is in fact based on observations 11-13 only. The matched-pair test, with "prior knowledge" of $\hat{\sigma}_1$=552.4 kbps.

detects the difference at the 14th observation.

The two-sample tests gave the following results. Listed in Table 1 below are the p-values for the t-test, the Mann-Whitney test (labeled as MW), and the Rosenbaum test (labeled as Rb) based on 10, 15, 20, 25 and 29 (=whole sample) pairs of measurements, respectively. The p-value is the probability of observing the same or a higher test-statistic value than the one obtained, if the null-hypothesis is true, i-e., if there is no change in the means (or no change in the medians for non-parametric tests that test for a change in the median).

TABLE 1 p-values for two-sample tests for given number of observed measurement pairs

| Test | 10 | 15 | 20 | 25 | 29 |
|---|---|---|---|---|---|
| t-test | 0.534 | 0.112 | 0.212 | 0.054 | 0.012 |
| MW | 0.529 | 0.116 | 0.192 | 0.054 | 0.015 |
| Rb | 0.25 | 0.031 | 0.25 | 0.063 | 0.016 |

We see that the hypothesis of equal means is not rejected at the 0.05 level of significance by the t-test or the Mann-Whitney test, except when the whole sample is considered. The Rosenbaum test, however, already rejects at the 0.05 level of significance after 15 observations. This is encouraging, since this test does not rely on any prior knowledge, is on-line and the measurement series are weakly cross-correlated.

In light of the non-zero cross-correlation between the measurements from the two interfaces, it is interesting to see how the matched-pair tests perform. The results for the Wilcoxon signed-rank test and the sign test are shown below in Table 2.

TABLE 2 p-values for matched-pair tests for given number of observed measurement pairs

| Test | 10 | 15 | 20 | 25 | 29 |
|---|---|---|---|---|---|
| Wsr | 0.557 | 0.055 | 0.143 | 0.022 | 0.004 |
| sign | 0.344 | 0.035 | 0.041 | 0.015 | 0.002 |

We see that the simple sign-test performs well and seems to be a good choice for online implementation on matched pairs of measurements.

Next, we have collected 3 new series of measurements, from three different interfaces on a mobile terminal: an 11 Mbps Wavelan 802.11 link, a 10 Mbps Ethernet link and a 1xRTT CDMA cellular link, to a test site identified by www.toast.net. The available bandwidths were collected every 2 minutes from 10 AM to 5 PM on a particular day on our local WLAN, Ethernet and public cellular network. See FIG. 4. Preliminary analysis of each of the measurement series show, that the WiFi link has mean available bandwidth 1797.6±906.8 kbps, the Ethernet link has mean available bandwidth 1847.7±860.4 kbps, and the cellular link has mean available bandwidth 116.0±14.4 kbps.

Figure 5:
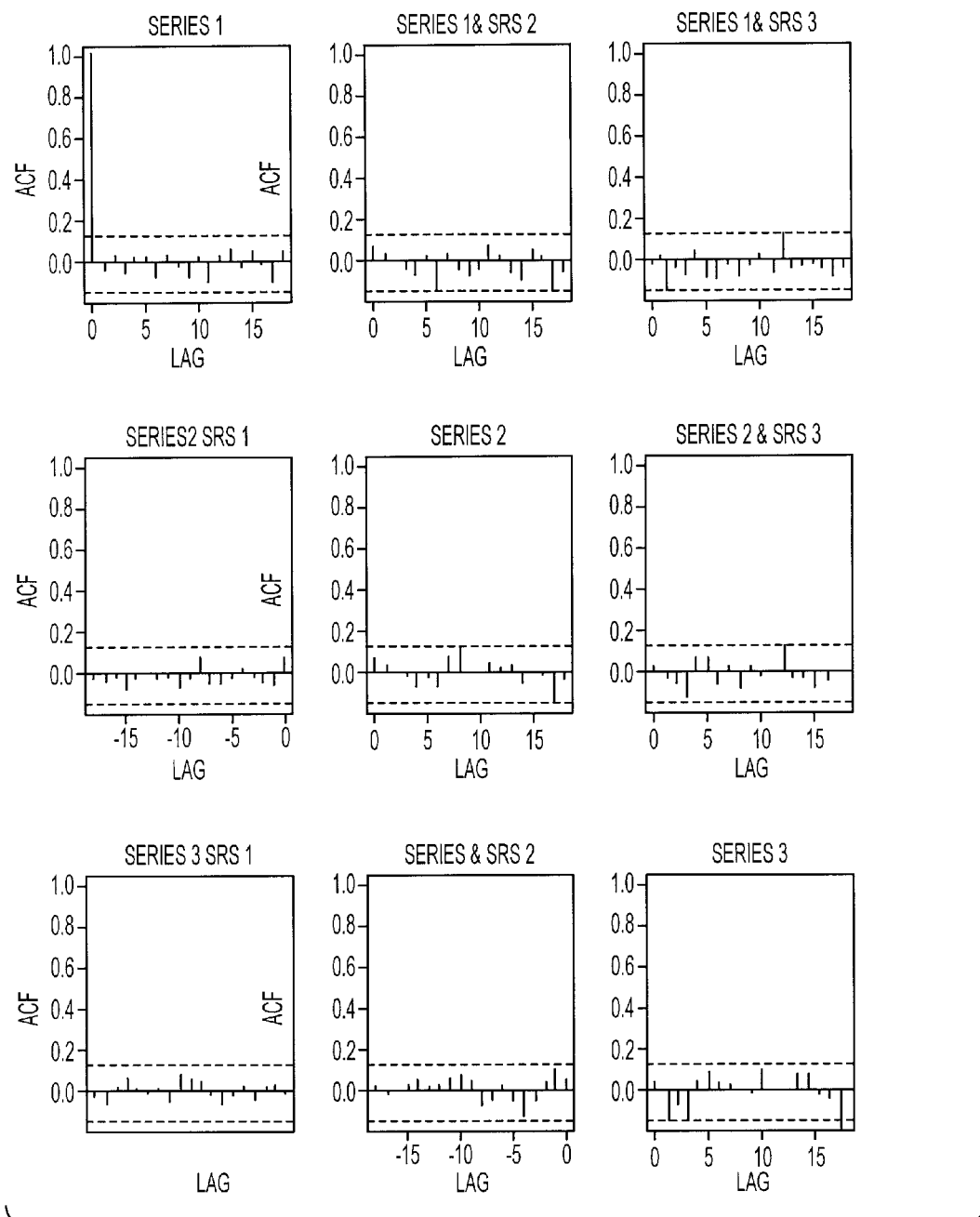
FIG. 5 is illustrative pair-wise correlation functions between the available bandwidth series of the three links.

FIG. 5 shows the nine pair-wise correlation functions, which indicate no significant correlation in the series. Furthermore, the cross-correlation coefficients are small as well, not exceeding 0.095.

Figure 4:
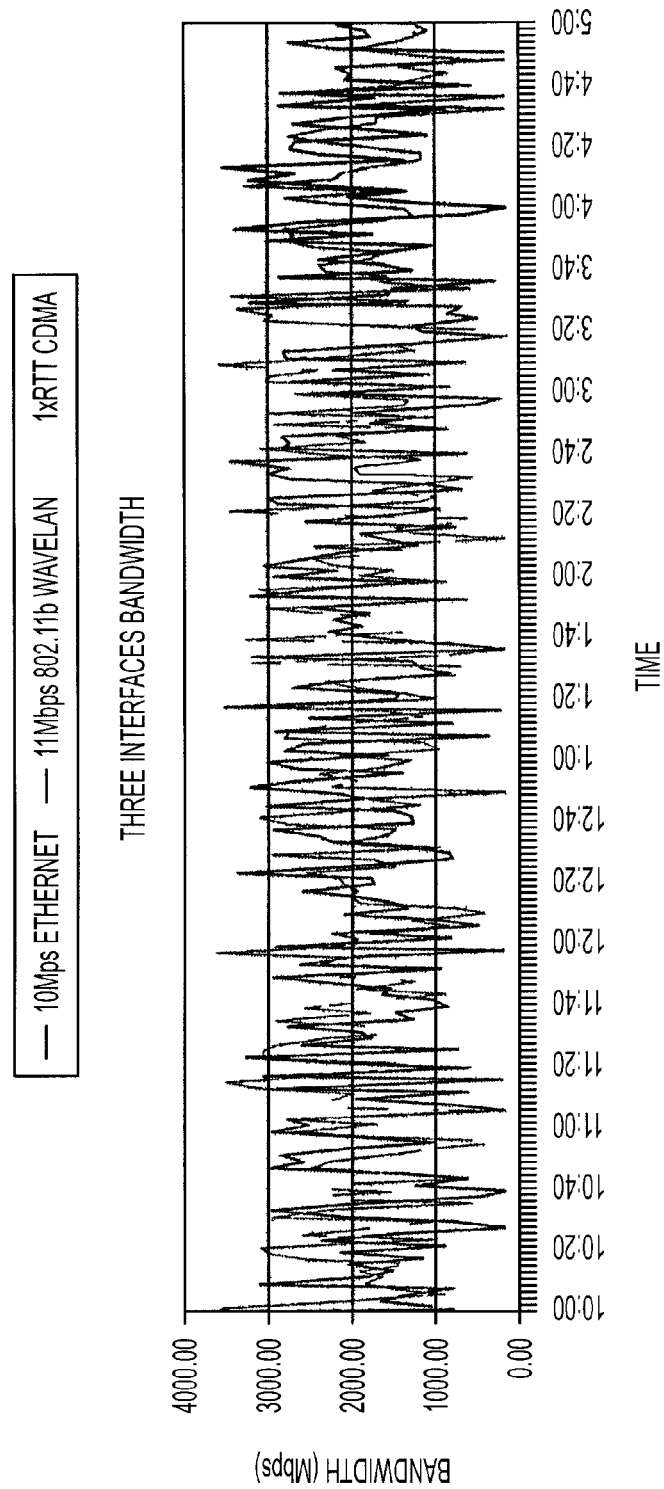
FIG. 4 is an illustrative graph showing Ethernet, Wavelan and DCMA 2000 1xRTT available path bandwidths.
Figure 6:
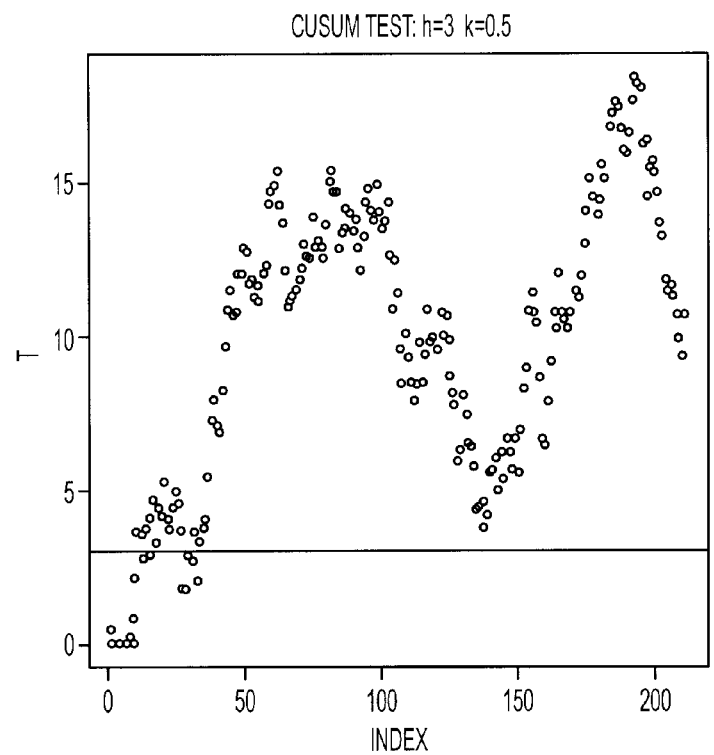
FIG. 6 is an illustrative graph showing results for CUSUM test on real measurements.
Figure 7:
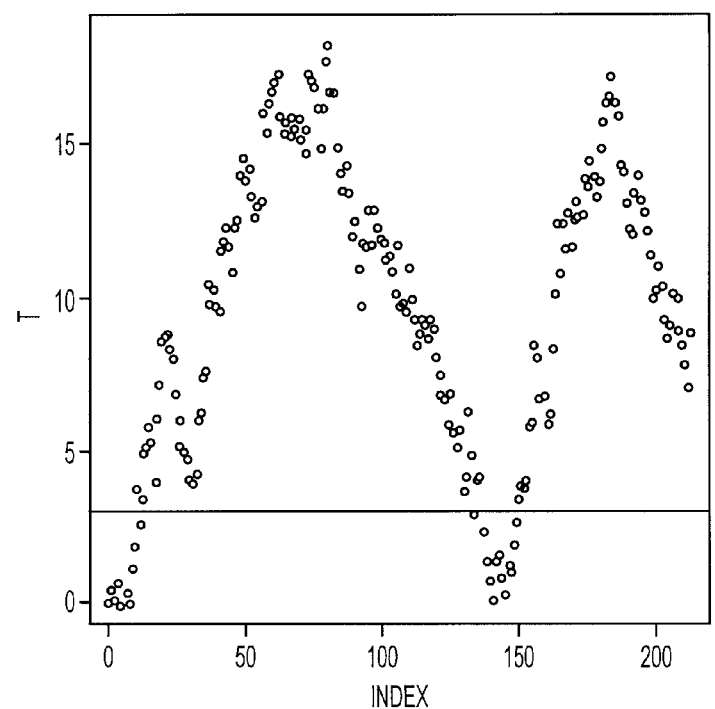
FIG. 7 is an illustrative graph showing results for CUSUM matched pair test on real measurements.

From FIG. 4, it can be seen that the cdma2000 1xRTT cellular link provides significantly lower bandwidth than the LAN and WLAN links. Comparison of the Ethernet and Wavelan links via the CUSUM test gave the following results: suppose the current path is the Wavelan path; when the CUSUM test is run on the measurements from the Ethernet path with the following prior knowledge about the available bandwidth through the current interface: mean 1797.6 kbps and standard deviation 906.9 kbps, the higher mean bandwidth on the Ethernet path is first detected after the 11'h observation, as illustrated in FIG. 6. Notice that the detection is in fact based on observations 9 through 11 only. The results are similar when we apply the CUSUM test for matched observations. See FIG. 7. Again, the higher mean bandwidth on the Ethernet link is first detected at the 111 h matched observation pair.

Broad Scope Of The Invention:

In the foregoing examples, the problem of interface comparison was discussed in the illustrative and non-limiting context based on available path bandwidth. Among other things, methods were presented above that use statistical testing to quickly determine whether a new interface has significantly higher quality than the currently used one. When accurate knowledge exists of the available bandwidth on the current path, methods using CUSUM procedures for quickest detection of a difference in mean bandwidth have shown good results. In the absence of prior knowledge of path quality over the current path, a simple non-parametric test provided good results.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example" and "NB" which means "note well."

What is claimed:

1. A method for substantially real-time comparison of quality of interfaces (QoIs) by mobile devices having multiple heterogeneous interfaces that communicate over heterogeneous wireless networks, comprising:
    a mobile device comparing in substantially real-time the qualities of multiple interfaces, including at least one cellular radio interface and at least one wireless local area network interface, of said mobile device that connect to heterogeneous networks using path quality metrics that are independent of how the QoI is measured, whether measured by a path through a wireless network alone or a path through both a wireless network and through a wired network,
    said method including said mobile device comparing path quality as a quickest change detection problem for observations from a new interface or comparing path quality based on sequential two sample tests,
    said mobile device performing said comparing of said multiple interfaces concurrently in real time during use of a current interface, and
    said mobile device selecting one of said interfaces based on said comparing.

2. A method for substantially real-time comparison of quality of interfaces (QoIs) by mobile devices having multiple heterogeneous interfaces that communicate over heterogeneous wireless networks, comprising:
    a mobile device comparing in substantially real-time the qualities of multiple interfaces, including at least one cellular radio interface and at least one wireless local area network interface, of said mobile device that connect to heterogeneous networks using path quality metrics that are independent of how the QoI is measured, whether measured by a path through a wireless network alone or a path through both a wireless network and through a wired network,
    said method including said mobile device performing a one-sample change point detection method or performing a non-parametric and on-line two-sample method,
    said mobile device performing said comparing of said multiple interfaces concurrently in real time during use of a current interface, and
    said mobile device selecting one of said interfaces based on said comparing.

3. A method for substantially real-time comparison of quality of interfaces (QoIs) by mobile devices having multiple heterogeneous interfaces that communicate over heterogeneous wireless networks, comprising:
    a mobile device comparing in substantially real-time the qualities of multiple interfaces, including at least one cellular radio interface and at least one wireless local area network interface, of said mobile device that connect to heterogeneous networks using path quality metrics that are independent of how a QoI is measured,
    said method including said mobile device comparing path qualities based on sequential two sample tests,
    said mobile device performing said comparing of said multiple interfaces concurrently in real time during use of a current interface, and
    said mobile device selecting one of said interfaces based on said comparing.

4. The method of claim 3, further including the mobile device having limited knowledge of the quality of the current path.

5. The method of claim 3, further including having insufficiently many measurements for an estimate of the mean quality of the current path and its variance and observations are not matched.

6. The method of claim 5, further including without the mobile device knowing values for mean and median, performing a test of which interface has a higher mean or median.

7. The method of claim 6, further including performing a test of the difference in average quality by testing for a difference in a location of samples.

8. The method of claim 7, wherein said method is non-parametric, works for unequal sample sizes, and is performed on-line.

9. The method of claim 7, wherein said method employs a Rosenbaum test.

10. The method of claim 9, wherein a test statistic $T_R$ includes a total number of a second interface's data points which have a value larger than a largest value in a first interface's data points.

11. The method of claim 10, wherein if an overall maximum is not from a sample set from the second interface, then the test stops, and a null-hypothesis $H_0$ is not rejected in favor of $H_1$, and otherwise $H_0$ is rejected in favor of $H_1$ if $T_R$ is larger than a value $C(a,n_1,n_2)$, calculated using the distribution of $T_R$.

12. The method of claim 7, wherein the method is based on the length of a high-end extreme run of samples for a second interface or a low-end extreme run of samples for a first interface.

13. The method of claim 12, further including repeating the test for a new observation or a new batch of observations.

14. The method of claim 3, further including using non-parametric approaches to test differences related to paired observations that are strongly correlated.

15. The method of claim 14, further including using a Wilcoxon sign test.

16. The method of claim 3, further including performing the two sample test even when the mobile has more than two interfaces.

* * * * *

UNITED STATES PATENT AND TRADEMARK OFFICE
CERTIFICATE OF CORRECTION

PATENT NO. : 8,798,006 B2
APPLICATION NO. : 12/973300
DATED : August 5, 2014
INVENTOR(S) : van den Berg et al.

It is certified that error appears in the above-identified patent and that said Letters Patent is hereby corrected as shown below:

On the Title Page, in item (56), under "OTHER PUBLICATIONS", in Column 2, Line 5, delete "bandwifth" and insert -- bandwidth --, therefor.

On the Title Page, in item (57), under "ABSTRACT", in Column 2, Line 7, delete "Qol" and insert -- QoI --, therefor.

In the Specification

In Column 1, Line 8, delete "(Qol),"  and insert -- (QoI), --, therefor.

In Column 3, Line 61, delete "Labal" and insert -- Label --, therefor.

In Column 4, Line 33, delete "T. Anjani et al.," and insert -- T. Anjali et al., --, therefor.

In Column 4, Line 36, delete "T. Anjani et al.," and insert -- T. Anjali et al., --, therefor.

In Column 5, Line 36, delete "(Qols)" and insert -- (QoIs) --, therefor.

In Column 5, Line 40, delete "Qol" and insert -- QoI --, therefor.

In Column 5, Line 47, delete "(Qols)" and insert -- (QoIs) --, therefor.

In Column 5, Line 51, delete "Qol" and insert -- QoI --, therefor.

In Column 5, Line 58, delete "(Qols)" and insert -- (QoIs) --, therefor.

In Column 5, Line 62, delete "Qol" and insert -- QoI --, therefor.

In Column 6, Line 4, delete "(Qols)" and insert -- (QoIs) --, therefor.

In Column 6, Line 8, delete "Qol" and insert -- QoI --, therefor.

Signed and Sealed this
Twenty-first Day of April, 2015

Michelle K. Lee
*Director of the United States Patent and Trademark Office*

CERTIFICATE OF CORRECTION (continued)

In Column 6, Line 14, delete "QoI metrics" and insert -- QoI metrics --, therefor.

In Column 6, Line 15, delete "QoI measurement," and insert -- QoI measurement, --, therefor.

In Column 6, Line 22, delete "(QoI)." and insert -- (QoI). --, therefor.

In Column 6, Line 26, delete "QoI" and insert -- QoI --, therefor.

In Column 6, Line 28, delete "QoIs" and insert -- QoIs --, therefor.

In Column 6, Line 33, delete "QoI" and insert -- QoI --, therefor.

In Column 9, Line 63, delete "(QoI)"," and insert -- (QoI)", --, therefor.

In Column 10, Line 37, delete "(QoI)" and insert -- (QoI) --, therefor.

In Column 10, Line 52, delete "QoI" and insert -- QoI --, therefor.

In Column 11, Line 15, delete "QoI." and insert -- QoI. --, therefor.

In Column 11, Line 20, delete "QoI" and insert -- QoI --, therefor.

In Column 11, Line 32, delete "QoI" and insert -- QoI --, therefor.

In Column 11, Line 45, delete "QoI" and insert -- QoI --, therefor.

In Column 11, Line 50, delete "QoI" and insert -- QoI --, therefor.

In Column 11, Line 52, delete "QoI." and insert -- QoI. --, therefor.

In Column 13, Line 30, delete "QoI" and insert -- QoI --, therefor.

In Column 13, Line 32, delete "QoI" and insert -- QoI --, therefor.

In Column 13, Line 34, delete "QoI" and insert -- QoI --, therefor.

In Column 13, Line 44, delete "QoI because the QoI" and insert -- QoI because the QoI --, therefor.

In Column 13, Line 46, delete "QoI" and insert -- QoI --, therefor.

In Column 13, Line 47, delete "QoI" and insert -- QoI --, therefor.

In Column 14, Line 5, delete "QoI" and insert -- QoI --, therefor.

In Column 14, Line 7, delete "QoI" and insert -- QoI --, therefor.

In Column 14, Line 11, delete "QoI" and insert -- QoI --, therefor.

In Column 14, Line 13, delete "QoI" and insert -- QoI --, therefor.

In Column 14, Line 34, delete "QoI metrics" and insert -- QoI metrics --, therefor.

CERTIFICATE OF CORRECTION (continued)
U.S. Pat. No. 8,798,006 B2

In Column 14, Line 35, delete "Qol measurement." and insert -- QoI measurement. --, therefor.

In Column 14, Line 37, delete "Qol-such" and insert -- QoI-such --, therefor.

In Column 14, Line 42, delete "Qol." and insert -- QoI. --, therefor.

In Column 14, Line 43, delete "Qol," and insert -- QoI, --, therefor.